US011859575B2

(12) United States Patent
Becker

(10) Patent No.: US 11,859,575 B2
(45) Date of Patent: Jan. 2, 2024

(54) ARRANGEMENT FOR AN INTERNAL COMBUSTION ENGINE AND METHOD FOR COOLING SUCH AN ARRANGEMENT

(71) Applicant: INNIO Jenbacher GmbH & Co OG, Jenbach (AT)

(72) Inventor: Florian Becker, Muenster (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/909,326

(22) PCT Filed: Mar. 3, 2020

(86) PCT No.: PCT/AT2020/060059
§ 371 (c)(1),
(2) Date: Sep. 2, 2022

(87) PCT Pub. No.: WO2021/174267
PCT Pub. Date: Sep. 10, 2021

(65) Prior Publication Data

US 2023/0089357 A1 Mar. 23, 2023

(51) Int. Cl.
*F02F 1/16* (2006.01)
*F02F 1/04* (2006.01)

(52) U.S. Cl.
CPC ................ *F02F 1/16* (2013.01); *F02F 1/045* (2013.01)

(58) Field of Classification Search
CPC .................................... F02F 1/16; F02F 1/045
See application file for complete search history.

(56) References Cited

U.S. PATENT DOCUMENTS 1,575,638 A 3/1926 Pochobradsky et al.
5,251,578 A * 10/1993 Kawauchi ................ F02F 1/14 123/41.79
10,697,393 B2 6/2020 Becker et al.
2012/0234268 A1* 9/2012 Genter .................... F02F 1/004 123/41.72
2012/0240883 A1* 9/2012 McGiffin .................. F02F 1/16 123/41.72
2013/0032117 A1* 2/2013 Worthington ............ F16J 10/04 29/888.011

(Continued)

FOREIGN PATENT DOCUMENTS

DE 1751787 A1 2/1972
DE 102017131331 A1 6/2019

(Continued)

OTHER PUBLICATIONS

PCT International Search Report and Written Opinion; Application No. PCT/AT2020/060059; dated Mar. 3, 2020; 9 pages.

*Primary Examiner* — Long T Tran
(74) *Attorney, Agent, or Firm* — Fletcher Yoder, P.C.

(57) ABSTRACT

An arrangement for an internal combustion engine includes a crank case, a cylinder liner disposed in a cylinder of the crank case and including a flange, and a cylinder head disposed on an end of the cylinder delimiting a combustion zone inside the cylinder liner, wherein the flange of the cylinder liner is braced between the cylinder head and the crank case, wherein a flange cooling cavity is provided, which is delimited by a circumferential surface of the flange of the cylinder liner and the cylinder head.

20 Claims, 5 Drawing Sheets

(56) References Cited

U.S. PATENT DOCUMENTS

| | | | | |
|---|---|---|---|---|
| 2013/0333658 | A1* | 12/2013 | Yamamoto | F02F 1/10 29/888.01 |
| 2015/0377178 | A1* | 12/2015 | Bussieres | F02F 1/14 123/41.72 |
| 2016/0273479 | A1* | 9/2016 | Azevedo | F02F 1/102 |
| 2017/0218934 | A1* | 8/2017 | Hebrard | F04B 27/0446 |
| 2019/0003415 | A1 | 1/2019 | Becker et al. | |
| 2020/0256278 | A1* | 8/2020 | Park | F02F 1/10 |
| 2021/0148302 | A1* | 5/2021 | Kumar | F02F 1/004 |

FOREIGN PATENT DOCUMENTS

| | | | |
|---|---|---|---|
| EP | 0356227 | A2 | 2/1990 |
| EP | 2604835 | A1 | 6/2013 |
| GB | 968342 | A | 9/1964 |
| GB | 2134974 | A | 8/1984 |
| GB | 2194588 | A | 3/1988 |
| JP | H10159645 | A | 6/1998 |
| JP | 2013060918 | A | 4/2013 |
| WO | 2017004643 | A1 | 1/2017 |

* cited by examiner

ARRANGEMENT FOR AN INTERNAL COMBUSTION ENGINE AND METHOD FOR COOLING SUCH AN ARRANGEMENT

CROSS-REFERENCE TO RELATED APPLICATION

This application is a National Stage entry from, and claims benefit of, PCT Application No. PCT/AT2020/060059, filed on Mar. 3, 2020; entitled "INTERNAL COMBUSTION ENGINE", which is herein incorporated by reference in its entirety.

BACKGROUND

The present invention concerns an arrangement comprising a crank case, a cylinder head, and a cylinder liner with a classifying portion and a method for cooling such an arrangement.

Known in the prior art are arrangements comprising a crank case, a cylinder head, and a cylinder liner disposed inside the cylinder in the crank case. Cylinder liners are used commonly to form the inner surface of a combustion zone inside the cylinder, because the material of the body of the crank case itself does in many cases not fulfill the tribological requirements, the requirements stemming from the movement of the piston along this inner surface.

The design of the cylinder liner, the cylinder head, and the crank case in this area is mainly limited by two factors: The cylinder liner has to be mounted inside the cylinder and there has to be sufficient cooling of the cylinder liner and the part of the cylinder head facing the combustion zone (this area of the cylinder head is called "fire plate"). For cylinder liners according to the prior art reference is made to WO 2017/004643 A1.

There are generally two cooling concepts known in the prior art for cooling the cylinder liner. First, there can be a liner cooling cavity delimited by (an outside surface of) the cylinder liner on the inside and the crank case on the outside (wet cylinder liner). Secondly, the liner cooling cavity can be disposed inside the crank case, such that the heat present in the cylinder liner is transferred to the crank case and further into the cooling medium (dry cylinder liner).

The wet cylinder liner has the advantage that the cooling medium is directly in contact with the body of the cylinder liner, which results in superior heat transfer from the cylinder liner into the cooling medium. This offers a substantial advantage as a better cooled cylinder liner means less wear, and in turn less maintenance and longer service life of the cylinder liner.

For mounting the wet cylinder liner in the cylinder, the prior art provides a flange on the cylinder liner which is generally braced between the crank case and the cylinder head. Known are flanges which are disposed on the end of the cylinder liner closest to the cylinder head (top hung cylinder liner) and flanges which are disposed somewhere along the body of the cylinder liner (mid stop cylinder liner).

The advantages of the top hung cylinder liner are easy manufacture and maintenance as the top hung flange is easily accessible after removing the cylinder head or before mounting the same.

However, by its nature, a top hung flange is quite close to the fire plate of the cylinder. The heat deposited in the fire plate and the flange by the combustion therefore would have to pass through the (relatively thick) flange and further through the crank case or the narrow interface between the flange and the liner cooling cavity, which results in a reduced heat transfer in the vicinity of the top hung flange. This can be quite disadvantageous as the thermal (and mechanical) loads near the fire plate and the top hung flange are often the highest in the whole internal combustion engine.

BRIEF DESCRIPTION

An aspect of the invention includes an arrangement with a top hung wet cylinder liner, where the heat transfer in the vicinity of the flange is improved.

This arrangement includes a flange cooling cavity, which is delimited by a circumferential surface of the flange of the cylinder liner and the cylinder head.

Regarding the method, a cooling medium is supplied to the flange cooling cavity, such that a cooling medium flow is induced in the flange cooling cavity, preferably at least partly in a circumferential direction around the flange of the cylinder liner.

The surprising circumstance the inventor has discovered is, that even though a cooling cavity disposed on the circumferential surface of the flange of the cylinder liner is relatively far away from the location where the heat is generated (due to the thickness of the flange), the thickness of the material of the flange and the neighbouring parts of the cylinder head offer a large enough heat transfer to effectively cool the inside of the cylinder liner and the cylinder head in the flange area and the fire plate.

At the same time, the advantages with respect to an easy mounting of the cylinder liner inside the cylinder by bracing the flange between the cylinder head and the crank case are retained.

A main component of the cooling medium (or all of it) can be water. Additives and/or contaminants can be present as a matter of course.

According to an aspect of the invention, a cooling medium flow can be induced in the flange cooling cavity, and in preferred embodiments the cooling medium flow is at least partly directed circumferentially around the flange and/or the cylinder head, which can improve the heat transfer.

As indicated before, for the purposes of this document, the term "cylinder" denominates the opening in the crank case in which the cylinder liner is mounted. The combustion zone in which the combustion takes place is then (in part) defined by an inner surface of the cylinder liner.

The flange of the cylinder liner can be a thicker part of the cylinder liner, of preferably substantially polygonal, in particular substantially rectangular, cross-section. Of course, one or more chamfers can be present.

Preferably, the flange can have a substantially cylindrical outer surface (peripheral surface).

The height of the flange can be understood to be the dimension of the flange along a longitudinal axis of the cylinder liner. The thickness of the flange can be understood as the dimension of the flange in a radial direction with respect to the longitudinal axis of the cylinder liner.

The longitudinal axis of the cylinder liner will in most cases coincide with a longitudinal axis of the cylinder. However, other embodiments of the invention where the longitudinal axis of the cylinder liner and the cylinder axis do not coincide or are not parallel are in principle conceivable.

The cylinder liner can have a body (on which the flange is attached), which has a substantially cylindrical outer surface and/or a substantially cylindrical inner surface (which defines the combustion zone).

Cylindrical surfaces (or volumes) can in general be understood to have an axis along which the cross-section of the surface is constant. This cross-section can preferably be circular, but other embodiments with polygonal or oval cross-section are in principle conceivable.

The circumferential surface of the flange can be understood to be peripheral surface of the flange, preferably an outermost surface of the flange.

This circumferential surface can be of substantially cylindrical shape.

The bracing of the flange between the cylinder head and the crank case at least partly mounts and fixes the cylinder liner in the cylinder. Further component parts can be present in the force flux created by this bracing.

All features and advantages described in connection with the prior art can also be included in embodiments of the invention.

Cavities or zones which are "delimited" by any component can be understood to directly border on said cavity or zone, although certain insets which substantially do not interfere with the function of said cavity or zone can in principle also be used according to aspects of the invention. Naturally, said cavities or zones can further (i.e., additionally) be delimited by further component parts.

An internal combustion engine is also protected with an arrangement according to aspects of the invention.

Of course, an internal combustion engine will in most cases have more than one cylinder (preferably more than 8, 10, or 12 cylinders). Aspects of the invention can then be realised in any number of the cylinders of the combustion engine.

Aspects of the invention can particularly preferably be used in stationary or naval internal combustion engines, in particular gas engines.

Such engines can be designed to operate with a lean burn concept or a concept employing essentially stoichiometric combustion.

Internal combustion engines can preferably be used to drive a generator for generating electrical energy. Such combinations of an internal combustion engine driving a generator are known as gensets.

In some modes of operation, the cooling cavities and passages and a medium flow therein can be used to heat the respective areas instead of cooling them, e.g., for preheating the engine.

Further advantageous embodiments are defined in the dependent claims.

The flange of the cylinder liner can be arranged on an end of the cylinder liner closest to the cylinder head.

The flange cooling cavity can further be delimited peripherally (i.e., along its outer circumference) by the crank case and/or a further component part, separate from the crank case.

The flange cooling cavity can further be delimited by a head gasket sealing the interface between the cylinder head and the cylinder liner.

Such gaskets can be used to seal the combustion zone against the outside, possibly including the flange cavity and/or other cavities in the area.

The head gasket can be disposed between the cylinder head and the flange, wherein the force flux stemming from the bracing of the flange between the crank case and the cylinder head.

The flange cooling cavity can preferably cover at least 20%, preferably at least 35% and particularly preferably at least 50%, of the height of the circumferential surface of the flange of the cylinder liner.

In particularly preferred embodiments, the surface covered by the flange cooling cavity in this way can be closer to the cylinder head than a peripheral (circumferential) area of the flange not covered by the flange cooling cavity.

The cylinder head can have a peripheral surface, which is an extension of the circumferential surface of the flange, and the flange cooling cavity can cover this area with roughly the same amount of coverage compared to the covered circumferential surface of the flange.

The flange cooling cavity can cover at least 75%, preferably at least 90% and particularly preferably 100%, of the circumference of the circumferential surface of the flange of the cylinder liner. Formulated differently, the flange cooling cavity can reach around 75%, preferably 90% and particularly preferably all around, the circumferential surface of the flange.

The flange cooling cavity can substantially have the shape of an annulus disposed around and/or disposed as an abutment on the circumferential surface of (the main body of) the flange of the cylinder liner. The flange can reach around or abut 75%, preferably 90% and particularly preferably all around, the circumferential surface of the flange.

The flange cooling cavity can have a substantially polygonal, in particular substantially rectangular, cross-section. Of course, rounded edges and/or minor deformities of this rough polygonal shape can be present.

It can preferably be provided, that

- there is a liner cooling cavity delimited by the crank case and a body of the cylinder liner disposed further away from the cylinder head than the flange, and
- there is a head cooling cavity delimited by the cylinder head, wherein the flange cooling cavity is in fluid communication with the liner cooling cavity through a first set of cooling medium passages, and the flange cooling cavity is in fluid communication with the head cooling cavity through a second set of cooling medium passages.

The head cooling cavity can be substantially completely inside the cylinder head and/or the cylinder head can delimit the head cooling cavity in conjunction with other component parts, in particular for a valve seat cooling or a cooling of an ignition assembly. The ignition assembly can include a spark plug and/or a spark plug liner and/or a pre-chamber.

The liner cooling cavity can be further delimited on the outside by the crank case.

There can be more than one liner cooling cavity and more than one head cooling cavity. More than one head cooling cavity can in particular be used to optimise the cooling of different areas of the cylinder head, which receive higher thermal loads, such as the fire plate or the intake and exhaust ports/valves.

The first set of cooling medium passages can pass through the crank case and/or the further component part.

The second set of cooling medium passages can pass through the cylinder head.

The cooling medium passages of the first and second set of cooling medium passages can preferably be straight, i.e., without curves of their middle axes. However, also curved cooling passages are conceivable in the context of the invention (may be manufactured using an additive manufacturing technique).

The cooling medium passages of the first and second set of cooling medium passages can preferably be aligned substantially radially with respect to the longitudinal axis of the cylinder liner.

However, other embodiments are possible where the middle axes of the cooling medium passages do not intersect with the longitudinal axis of the cylinder liner (i.e., oblique with respect to the longitudinal axis), for example, to reach a head cooling cavity in the vicinity of an exhaust port/valve in the cylinder head.

Particularly preferred embodiments can combine radially and non-radially aligned cooling medium passages.

The first and second set of cooling medium passages can be manufactured as bores in the cylinder head, the crank case or the further component part.

In particular, the first set of cooling medium passages can be particularly easily manufactured as two bores, each of which meets at a given point in the crank case or the further component part.

The first and second set of cooling medium passages can be distributed evenly around the circumference of the flange cooling cavity and/or the cylinder head and/or the cylinder liner. In other embodiments in the context of the invention, there are more cooling medium passages of the first and second set of cooling medium passages where a higher demand for cooling is present. Such areas where better cooling may be advantageous could be in the vicinity of the exhaust ports/valves (or valve seats) in the cylinder head.

First openings interfacing the flange cooling cavity and the first set of cooling medium passages and second openings interfacing the flange cooling cavity and the second set of cooling medium passages can particularly preferably provided, and, viewed along a longitudinal axis of the cylinder liner, the first openings and the second openings can have different angular positions relative to the longitudinal axis.

In this way, a cooling medium flow with substantially circumferential direction can be induced in the flange cooling cavity, which can further promote an improved cooling of the flange of the cylinder liner and the fire plate.

In particular, for this purpose, a substantial angular separation (in said longitudinal view with the longitudinal axis of the cylinder liner as centre point) can be preferred. Such an angular separation can be more than 3°, preferably more than 5° and particularly preferably more than 7°, in an area with a higher need for cooling (e.g., in the area of exhaust ports/valves of the cylinder). In areas where the higher need for cooling may not be present, the angular separation can at least be 5°, preferably 8° and particularly preferably 10°.

As mentioned, such angular separation can induce a circumferential medium flow in the flange cooling cavity, further promoting the heat transfer in the vicinity of the flange and the fire plate.

The liner cooling cavity can further be delimited by a wall of the flange of the cylinder liner, the wall facing away from the cylinder head. This wall can substantially extend perpendicularly with respect to the circumferential (outer) surface of the flange.

The body of the cylinder liner can preferably have a cylindrical outer surface and/or a cylindrical inner surface.

A pump can be provided to produce the cooling medium flow in the flange cooling cavity and—if present—also in the liner cooling cavity, the head cooling cavity and/or other cooling cavities.

The general direction of this cooling medium flow can be directed from the liner cooling cavity through the flange cooling cavity to the head cooling cavity or from the head cooling cavity through the flange cooling cavity to the liner cooling cavity.

Other serial or parallel flow directions can also be conceived in the context of the invention.

BRIEF DESCRIPTION OF THE DRAWINGS

Further details and advantages are apparent from the figures and the accompanying description of the figures. The figures show.

DETAILED DESCRIPTION

Figure 1:
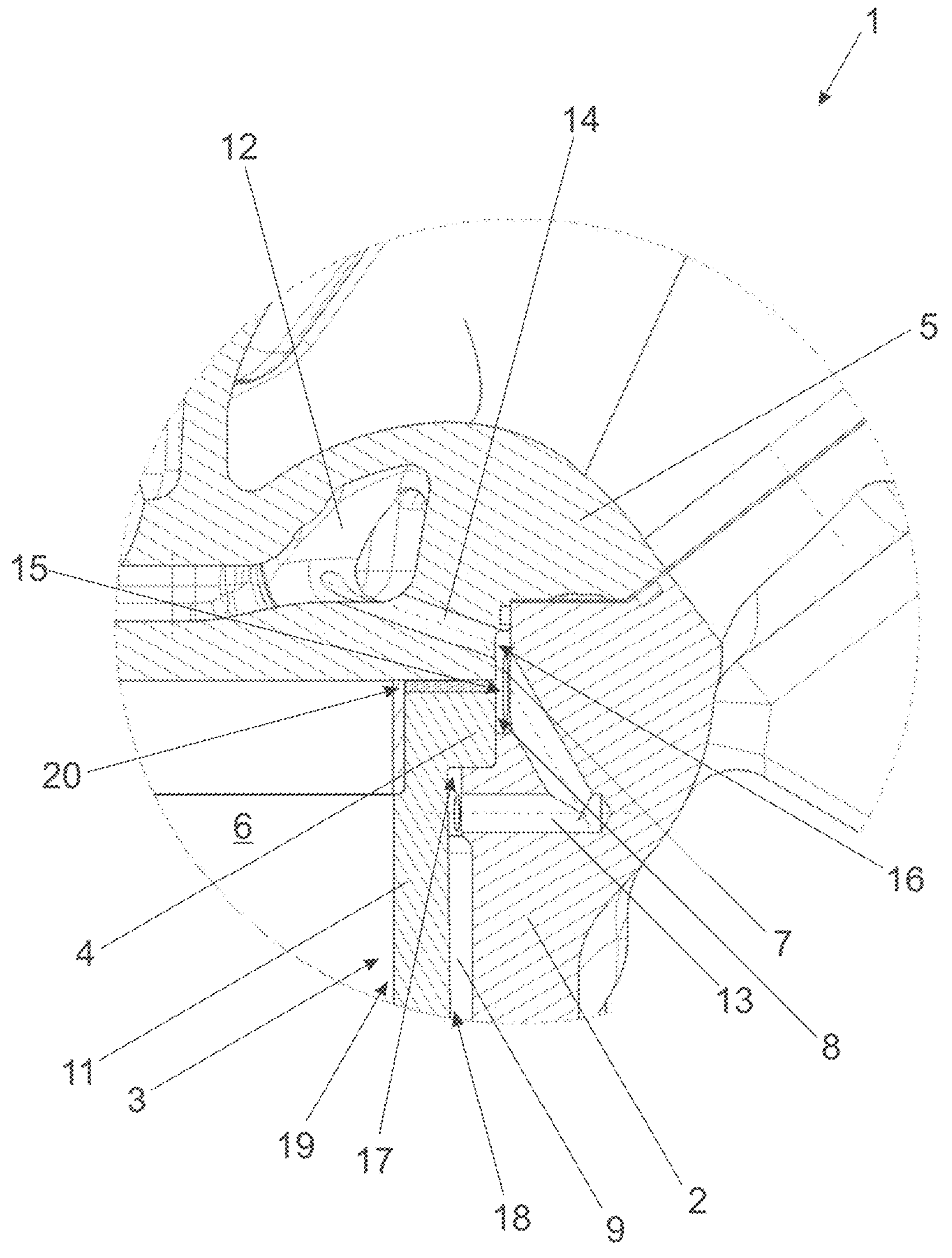
FIG. 1 a depiction showing the principle of an embodiment of the invention.
Figure 2:
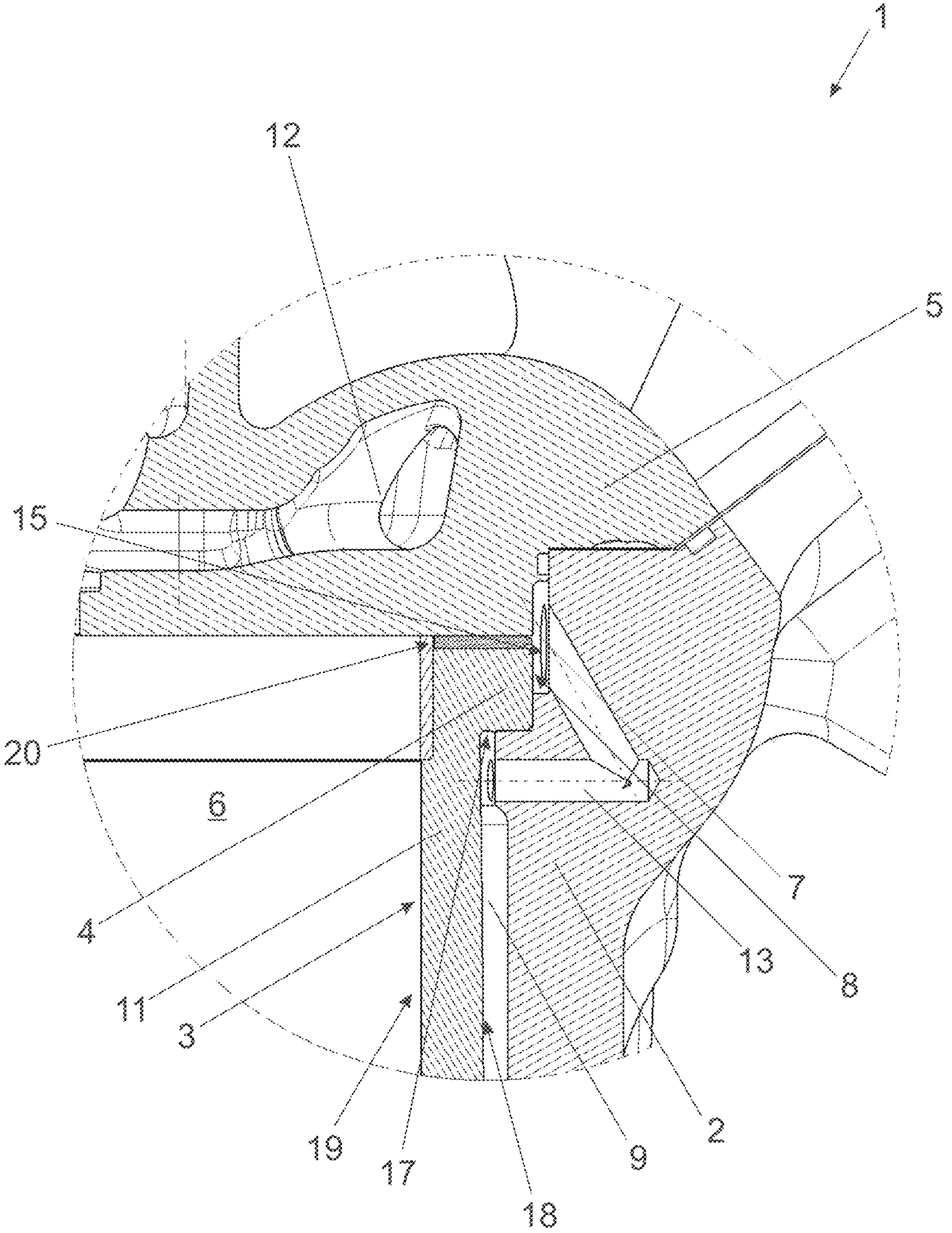
FIG. 2 a first cross-section of the embodiment of FIG. 1.
Figure 3:
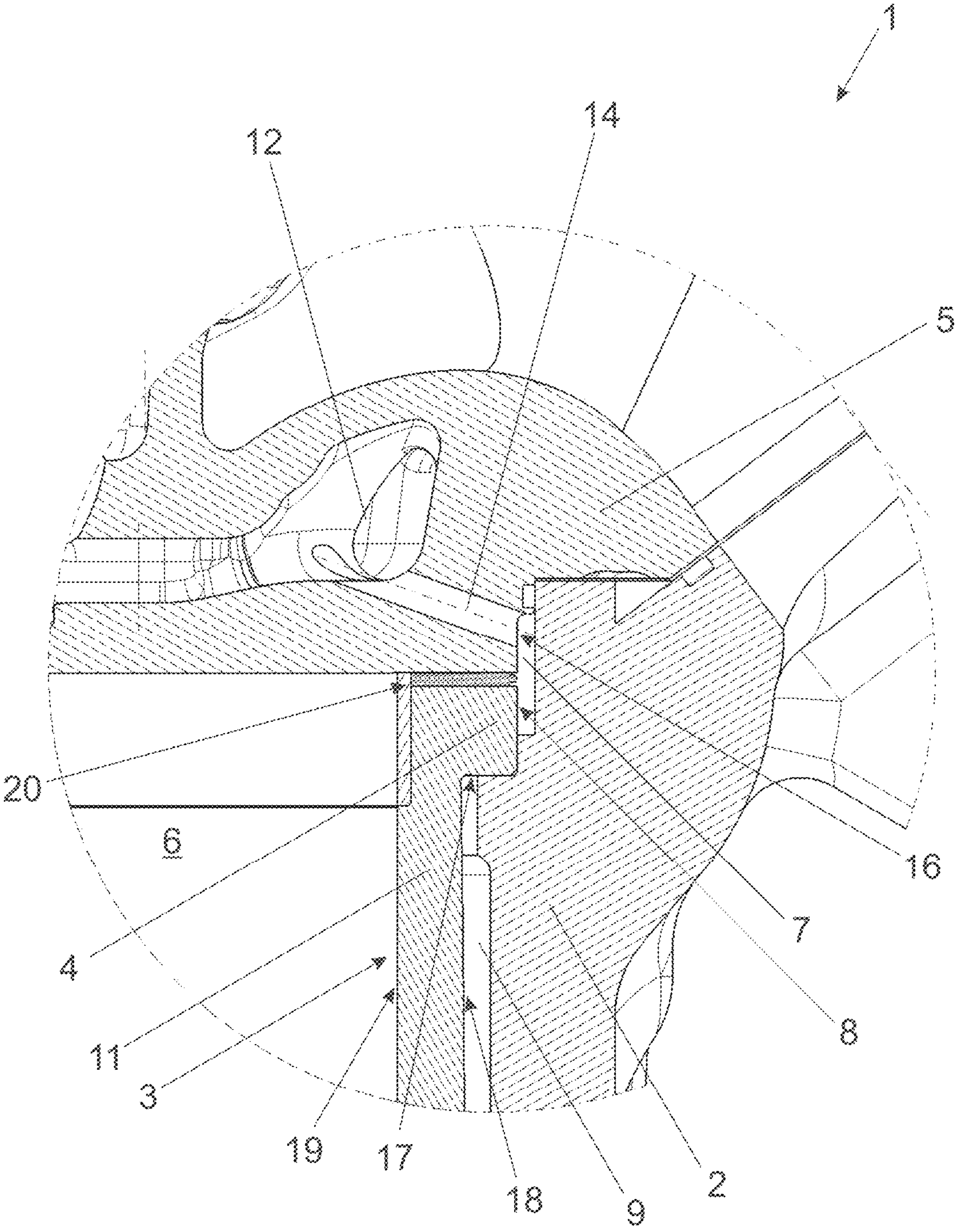
FIG. 3 a second cross-section of the embodiment of FIG. 1.

FIG. 1 shows an internal combustion engine 1 comprising the arrangement according to aspects of the invention. The depiction shows two combined cross-sections in order to explain the principle of the arrangement. It should be mentioned that the cooling medium passages of the first set of cooling medium passages 13 and the cooling medium passages of the second set of cooling medium passages 14 actually have an angular separation, which is not shown in FIG. 1, but can be seen in FIG. 5. Proper cross sections through a cooling medium passage of the first set of cooling medium passages 13 and a cooling medium passage of the second set of cooling medium passages 14 are shown in FIGS. 2 and 3, respectively.

The internal combustion engine 1 comprises the arrangement including the crank case 2, the cylinder liner 3, and the cylinder head 5.

The cylinder liner 3 is mounted in a simple and easy manufacturable and maintainable manner in a cylinder of the crank case 2 via a flange 4, which is arranged circumferentially around a body 11 of the cylinder liner 3 (top hung cylinder liner 3). For this purpose, the flange 4 is braced between the cylinder head 5 and the crank case 4.

This bracing can for example be achieved through load screws around the periphery of the cylinder (not depicted).

The flange 4 in this embodiment has a substantially rectangular cross-section with a chamfer on the outer edge facing the cylinder head.

Between the flange 4 and the facing surface of the cylinder head 5, there is a head gasket 20 sealing the combustion zone 6.

The cylinder of the crank case 2 as well as the body 11 of the cylinder liner 3 with its outer surface 18 and its inner surface 19 and the circumferential surface 8 of the flange of the cylinder liner 3 are substantially of a cylindrical shape.

The flange 4, and consequently the circumferential surface 8 of the flange 4, completely reach around the body 11 of the cylinder liner 3.

According to aspects of the invention, there is a flange cooling cavity 7 arranged on the circumferential surface 8 of the flange 4.

The flange cooling cavity 7 is further delimited by the cylinder head 5. For this purpose, the cylinder head 5 has a peripheral surface extending the circumferential surface 8 of the flange 4 in the depiction above the head gasket 20.

The direction "above" the flange 4 is aligned with a longitudinal axis X (see FIG. 5) of the cylinder liner 3.

The flange cooling cavity 7 covers slightly more than half of the height of the circumferential surface 8 of the flange 4 and a roughly equal amount of a peripheral surface of the cylinder head 5 (as well as the head gasket 20).

There is a liner cooling cavity 9 delimited by the outer surface 18 of the cylinder liner 3 on the inside and the crank case 2 on the outside. Therefore, the cylinder liner 3 is in direct contact with the cooling medium during operation of the internal combustion engine 1 (wet cylinder liner 3). As mentioned in the introduction, the advantage of the wet cylinder liner 3 is a higher heat transfer as compared to dry cylinder liners where the cooling cavity is arranged inside the crank case 2.

The liner cooling cavity 9 is further delimited by a wall 17 of the flange 4, the wall facing away from the cylinder head 5.

Just like the flange cooling cavity 7, the liner cooling cavity 9 extends all the way around the cylinder liner 3.

There is also a head cooling cavity 12, which is disposed inside the cylinder head 5 for cooling the same, in particular for cooling the fire plate (in the depiction of FIG. 1 below the head cooling cavity 12) as well as intake and exhaust ports/valves.

The flange cooling cavity 7, according to aspects of the invention, is tied into the cooling circuit through a first set of cooling medium passages 13 providing fluid communication between the liner cooling cavity 9 and the flange cooling cavity 7, and a second set of cooling medium passages 14 providing fluid communication between the flange cooling cavity 7 and the head cooling cavity 12.

The first set of cooling medium passages 13 and the second set of cooling medium passages 14 can easily be manufactured using bores in the crank case 2 and the cylinder head 5.

In particular, the first set of cooling medium passages 13 can be manufactured using two bores, each of which meets at a certain point inside the crank case 2.

Of course, one of these bores originates at a location where the liner cooling cavity 9 is located and a second one of these bores originates where the flange cooling cavity 7 is located.

First openings 15 interface the first set of cooling medium passages 13 and the flange cooling cavity 7.

Second openings 16 interface the flange cooling cavity 7 and the second set of cooling medium passages 14.

It should be mentioned that the outer border of the flange cooling cavity 7 can also be formed by a further component part separate from the crank case 2, if this is desired. Such a separate component part can then of course include (at least part of) the first set of cooling medium passages 13.

In this embodiment, a pump (not shown) is provided for creating a cooling medium flow from the liner cooling cavity 9 through the flange cooling cavity 7 to the head cooling cavity 12. The cooling medium flow can however also be directed from the head cooling cavity 12 through the flange cooling cavity 7 to the liner cooling cavity 9.

Figure 5:
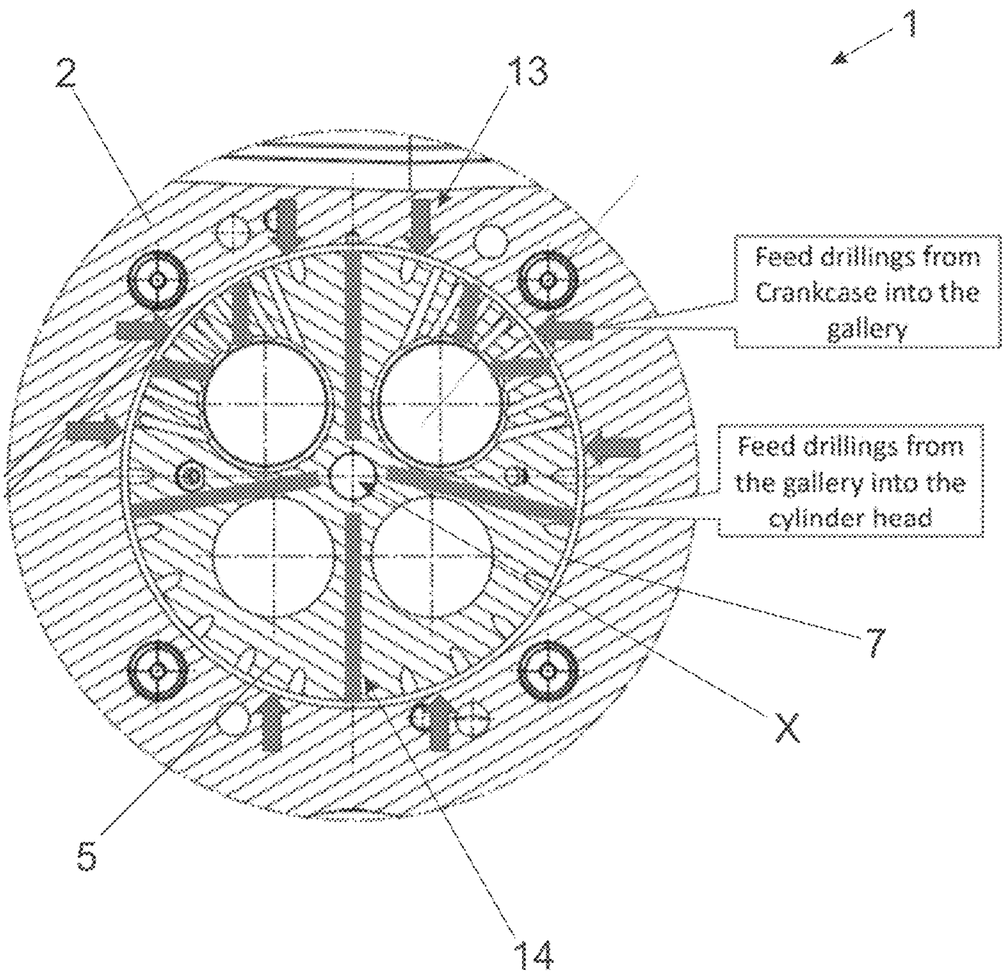
FIG. 5 a top view of the embodiment of FIG. 1.

As mentioned before, the first openings 15 and the second openings 16, and consequently at least partly the first set of cooling medium passages 13 and the second set of cooling medium passages 14, can have an angular separation (see FIG. 5).

Figure 4:
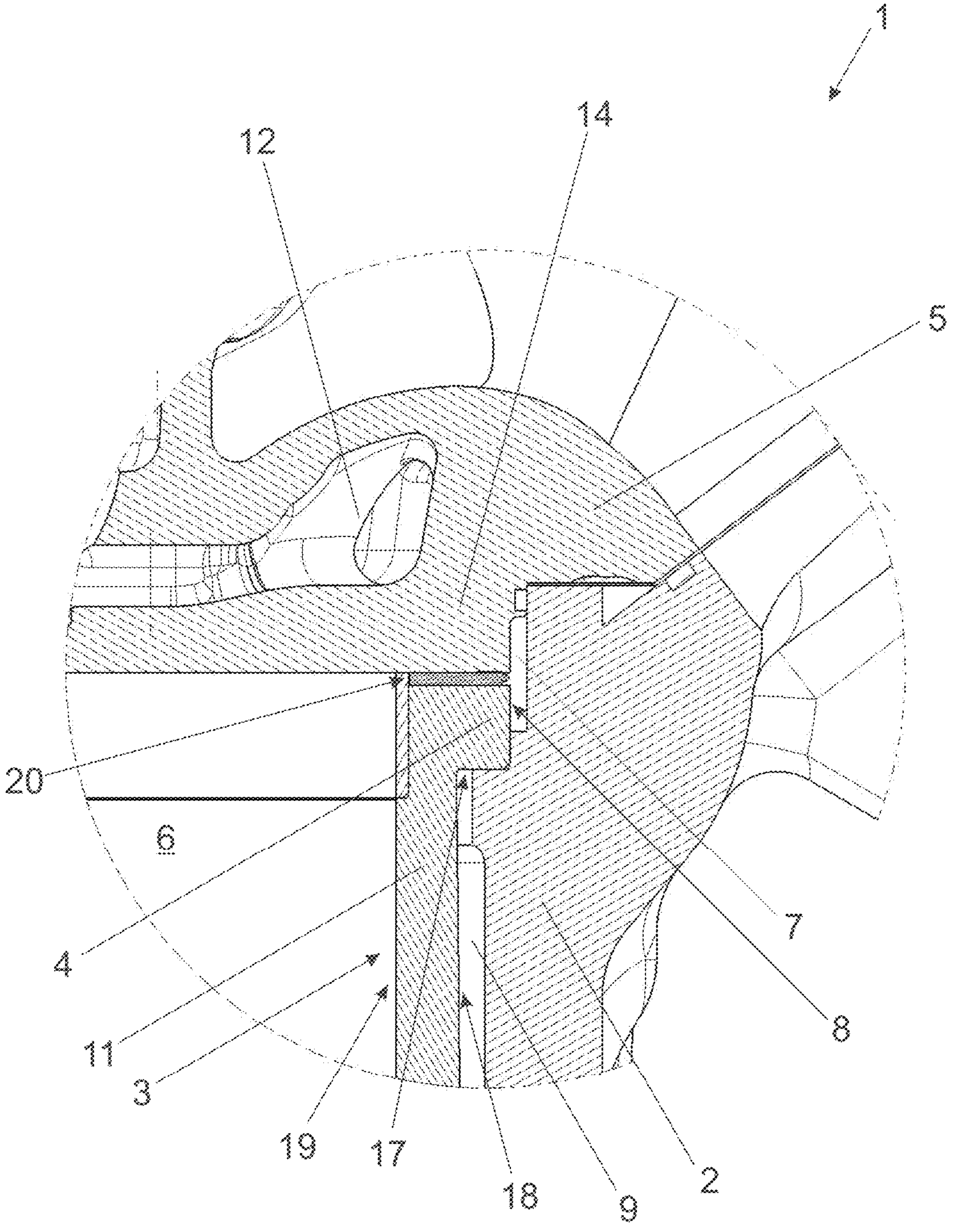
FIG. 4 a third cross-section of the embodiment of FIG. 1.

Accordingly, the first openings 15 and the second openings 16 would then not be visible in a single cross-section as depicted in FIG. 1. In this sense, FIG. 1 is only for describing the basic principle of aspects of the invention in this regard. "True" cross-sectional views are depicted in FIGS. 2 to 4, namely FIG. 2 a cross-sectional view through a cooling passage of the first set of cooling medium passages 13, FIG. 3 a cross-sectional view through a cooling passage of the second set of cooling medium passages 14, and FIG. 4 a cross-sectional view, where none of the first set of cooling medium passages 13 or the second set of cooling medium passages 14 are visible.

FIG. 5 shows a cross-sectional "top view", i.e., along the longitudinal axis X from the side of the cylinder head 5 and through the cylinder head 5. The longitudinal axis X is perpendicular to the view of FIG. 5 located at the indicated location.

The longitudinal axis X pertains to the cylinder liner 3. In this embodiment, the longitudinal axis X substantially coincides with the centre axis of the cylinder of the crank case 2.

The locations of the first set of cooling medium passages 13 are indicated by eight bars. The locations of the second set of cooling medium passages 14 are indicated by eight arrows. The locations of the first openings 15 and the second openings 16 are apparent from these indications.

Not all of the cooling passages are furnished with reference numerals.

The first set of cooling medium passages 13 and the second set of cooling medium passages 14 are generally embodied as depicted in FIG. 2 and FIG. 3, respectively.

Clearly, there is an angular separation, i.e., a non-zero angle with the position of the longitudinal axis X as centre point, between each of the first openings 15 on the one hand and each of the second openings 16 on the other hand.

This angular separation causes the cooling medium flow through the flange cooling cavity 7 to at least partly have a circumferential direction around the flange 4, which serves to improve the heat transfer in this area.

FIG. 5 also clearly shows that some of the second set of cooling medium passages 14 are aligned radially with respect to the longitudinal axis X and some are not, in order to optimize the cooling of the cylinder head 5 in the vicinity of intake and exhaust ports (valve seats).

In this embodiment of the invention, the cooling medium passages of the first set of cooling medium passages 13 are aligned radially with respect to the longitudinal axis X. In other conceivable embodiments of the invention, this does not have to be the case.

The intake and exhaust ports are the four circular structures roughly in the centre of FIG. 5, the larger ones being the exhaust ports.

FIG. 5 shows that there are more of the second set of cooling medium passages 14 near the exhaust ports/valves in order to improve the cooling in this area, as the exhaust ports/valves experience higher thermal loads than the intake ports/valves stemming from the exhaust gas after combustion.

The Figures depict a single cylinder of the internal combustion engine 1. Of course, most internal combustion engines 1 can, and in most cases will, have more than one cylinder. The invention can be realised on all of the cylinders of the internal combustion engine 1 according to aspects of the invention or a subset thereof.

The invention claimed is:

1. A system, comprising a crank case having a cylinder;

a cylinder liner disposed in the cylinder of the crank case, wherein the cylinder liner comprises a flange, and a cylinder head disposed on an end of the cylinder delimiting a combustion zone inside the cylinder liner, wherein the flange of the cylinder liner is braced between the cylinder head and the crank case, wherein a flange cooling cavity is disposed directly between and in fluid communication with a first outer circumferential surface of the flange of the cylinder liner and the cylinder head, and the flange cooling cavity extends over a radial distance between the first outer circumferential surface and an inner circumferential surface over a circumferential distance about a longitudinal axis of the cylinder liner.

2. The system of claim 1, wherein the flange of the cylinder liner is arranged on an end of the cylinder liner closest to the cylinder head, the flange cooling cavity extends along the first outer circumferential surface of the flange over a first distance along the longitudinal axis, the flange cooling cavity extends along a second outer circumferential surface of the cylinder head over a second distance along the longitudinal axis, and the end of the cylinder liner is disposed between the first and second distances.

3. The system of claim 2, wherein the flange cooling cavity is delimited by a head gasket sealing an interface between the cylinder head and the end of the cylinder liner, wherein the head gasket is disposed between the first and second distances.

4. The system of claim 1, wherein the flange cooling cavity is delimited peripherally by the inner circumferential surface on the crank case and/or a further component part, separate from the crank case.

5. The system of claim 1, wherein the flange cooling cavity covers at least 20% of the height of the outer circumferential surface of the flange of the cylinder liner and the flange cooling cavity covers at least 75% of a circumference of the outer circumferential surface of the flange of the cylinder liner.

6. The system of claim 1, wherein the flange cooling cavity comprises an annulus disposed completely about a circumference of the outer circumferential surface of the flange of the cylinder liner.

7. The system of claim 1, wherein the flange cooling cavity has a substantially polygonal cross-section disposed between the outer circumferential surface of the flange and the inner circumferential surface.

8. The system of claim 1, comprising:

a liner cooling cavity disposed between the crank case and a body of the cylinder liner, wherein the liner cooling cavity is disposed further away from the cylinder head than the flange, and a head cooling cavity disposed in the cylinder head, wherein the flange cooling cavity is in fluid communication with the liner cooling cavity through a first set of cooling medium passages, and the flange cooling cavity is in fluid communication with the head cooling cavity through a second set of cooling medium passages.

9. The system of claim 8, wherein the first set of cooling medium passages pass through the crank case, and the second set of cooling medium passages pass through the cylinder head.

10. The system of claim 8, wherein the first and second sets of cooling medium passages are external to the cylinder liner.

11. The system of claim 8, comprising first openings interfacing the flange cooling cavity and the first set of cooling medium passages and second openings interfacing the flange cooling cavity and the second set of cooling medium passages, wherein, viewed along a longitudinal axis of the cylinder liner, the first openings and the second openings have different angular positions relative to the longitudinal axis.

12. The system of claim 8, wherein the liner cooling cavity is delimited by a bottom wall of the flange of the cylinder liner, the bottom wall faces away from the cylinder head, and the flange cooling cavity is axially spaced apart from the bottom wall of the flange of the cylinder liner relative to the longitudinal axis.

13. The system of claim 1, comprising:

a head cooling cavity delimited by the cylinder head, the flange cooling cavity is in fluid communication with the head cooling cavity through a set of cooling medium passages, and the cylinder head includes intake and exhaust ports, wherein more of the set of cooling medium passages are near the exhaust ports than near the intake ports.

14. The system of claim 1, comprising an internal combustion engine comprising the crank case, the cylinder liner, and the cylinder head.

15. A method, comprising:

flowing a cooling medium through a flange cooling cavity disposed directly between and in fluid communication with a first outer circumferential surface of a flange of a cylinder liner and a cylinder head, wherein the cylinder liner is disposed in a cylinder of a crank case, the cylinder head is disposed on an end of the cylinder delimiting a combustion zone inside the cylinder liner, the flange of the cylinder liner is braced between the cylinder head and the crank case, and the flange cooling cavity extends over a radial distance between the first outer circumferential surface and an inner circumferential surface over a circumferential distance about a longitudinal axis of the cylinder liner.

16. The method of claim 15, comprising directing the cooling medium to flow at least partially in a circumferential direction around the flange of the cylinder liner.

17. The method of claim 15, wherein the flange cooling cavity covers at least 20% of a height of the outer circumferential surface of the flange of the cylinder liner, and the flange cooling cavity covers at least 75% of a circumference of the outer circumferential surface of the flange of the cylinder liner.

18. A system, comprising:

a body portion of an internal combustion engine, comprising:

a cylinder in the body portion;

a flange recess in the body portion, wherein the cylinder is configured to receive a cylinder liner having a flange disposed in the flange recess; and a flange cooling cavity disposed at least partially along the flange recess, wherein the flange cooling cavity extends over a radial distance directly between a first outer circumferential surface of the flange and an inner circumferential surface of the body portion over a circumferential distance about a longitudinal axis of the cylinder liner.

19. The system of claim 18, wherein the body portion comprises a liner cooling cavity configured to extend at least partially along the cylinder liner, a head cooling cavity configured to extend at least partially above the cylinder, a first cooling medium passage extending between the flange cooling cavity and the liner cooling cavity external from the cylinder liner, and a second cooling medium passage extending between the flange cooling cavity and the head cooling cavity external from the cylinder liner.

20. The system of claim 19, comprising the internal combustion engine having the cylinder liner disposed in the cylinder.

* * * * *